United States Patent
Chang

(10) Patent No.: US 10,752,118 B2
(45) Date of Patent: Aug. 25, 2020

(54) ELECTRIC VEHICLE CHARGING CIRCUIT AND CONTROL METHOD THEREOF

(71) Applicant: DELTA ELECTRONICS, INC., Taoyuan (TW)

(72) Inventor: Yu-Ming Chang, Taoyuan (TW)

(73) Assignee: DELTA ELECTRONICS, INC., Taoyuan (TW)

(*) Notice: Subject to any disclaimer, the term of this patent is extended or adjusted under 35 U.S.C. 154(b) by 323 days.

(21) Appl. No.: 15/835,428

(22) Filed: Dec. 7, 2017

(65) Prior Publication Data
US 2018/0339595 A1 Nov. 29, 2018

(30) Foreign Application Priority Data

May 23, 2017 (CN) .......................... 2017 1 0367755

(51) Int. Cl.
| | |
|---|---|
| *B60L 11/18* | (2006.01) |
| *B60L 53/20* | (2019.01) |
| *B60L 55/00* | (2019.01) |
| *B60L 53/63* | (2019.01) |

(52) U.S. Cl.
CPC ........... *B60L 11/1811* (2013.01); *B60L 53/20* (2019.02); *B60L 53/63* (2019.02); *B60L 55/00* (2019.02); *B60L 2210/10* (2013.01); *B60L 2210/30* (2013.01)

(58) Field of Classification Search
CPC ...... B60L 11/1811; B60L 53/20; B60L 55/00; B60L 53/63; B60L 2210/10; B60L 2210/30; H02J 7/0057; H02J 7/02; H02J 7/022; H02J 2007/0059
See application file for complete search history.

(56) References Cited

U.S. PATENT DOCUMENTS

| | | | |
|---|---|---|---|
| 9,391,462 B2* | 7/2016 | Yang ....................... H02J 5/005 |
| 10,040,363 B2* | 8/2018 | Beaston .................. B60L 53/66 |
| 2008/0238356 A1* | 10/2008 | Batson ................... H02J 7/0047 |
| | | | 320/103 |
| 2011/0213983 A1* | 9/2011 | Staugaitis ............... B60L 53/68 |
| | | | 713/176 |
| 2012/0146587 A1 | 6/2012 | Srinivasan et al. | |
| 2014/0002023 A1* | 1/2014 | Ichikawa ................ B60L 53/30 |
| | | | 320/109 |

(Continued)

FOREIGN PATENT DOCUMENTS

| | | |
|---|---|---|
| CN | 103762703 A | 4/2014 |
| CN | 105914799 A | 8/2016 |

*Primary Examiner* — Jared Fureman
*Assistant Examiner* — Emmanuel Dominique
(74) *Attorney, Agent, or Firm* — CKC & Partners Co., LLC

(57) ABSTRACT

An electric vehicle charging circuit includes a first power converting circuit configured to provide an output current to charge an electric vehicle, a power storage device, and a second power converting circuit electrically coupled between the power storage device and a bus, and configured to bi-directionally transmit power between the storage device and the bus. The first power converting circuit includes an AC/DC converter configured to convert an AC voltage to a bus voltage to the bus, and a DC/DC converter electrically coupled to the AC/DC converter at the bus and configured to output the output current. The second power converting circuit includes an isolated bidirectional converter.

17 Claims, 7 Drawing Sheets

(56) References Cited

U.S. PATENT DOCUMENTS

2015/0202973 A1* 7/2015 Chang ................ B60L 11/1811
                                                320/101
2016/0288658 A1* 10/2016 Rudolph ................ B60L 3/12
2018/0162228 A1* 6/2018 Gotz ..................... H02J 1/108

* cited by examiner

ELECTRIC VEHICLE CHARGING CIRCUIT AND CONTROL METHOD THEREOF

RELATED APPLICATIONS

This application claims priority to China Application Serial Number 201710367755.9, filed May 23, 2017, which is herein incorporated by reference.

BACKGROUND

Technical Field

The present disclosure relates to a charging circuit, and in particular, to an electric vehicle charging circuit.

Description of Related Art

In recent times, as environmental awareness rises, developing electric vehicles powered by electricity to replace traditional automobiles powered by fossil-based fuels has gradually becoming an important target of automobile industry.

However, in order to reduce charging time, the electric vehicle supply equipment (EVSE) nowadays requires high power to charge the electric vehicles (EV). As the battery capacity increases, the charging power required to charge the electric vehicle also increases. If the charging station charges the electric vehicle using the grid power, it may exceed the original contract capacity, and result in negative impact to the stability of the grid.

Therefore, how to improve the strategy of the charging station charging to the EVs to meet the charging requirement of the EVs is an important research topic in the field.

SUMMARY

One aspect of the present disclosure is an electric vehicle charging circuit. The electric vehicle charging circuit includes a first power converting circuit configured to provide an output current to charge an electric vehicle, a power storage device, and a second power converting circuit electrically coupled between the power storage device and a bus, and configured to bi-directionally transmit power between the storage device and the bus. The first power converting circuit includes an AC/DC converter configured to convert an AC voltage to a bus voltage to the bus, and a DC/DC converter electrically coupled to the AC/DC converter at the bus and configured to output the output current. The second power converting circuit includes an isolated bidirectional converter.

Another aspect of the present disclosure is an electric vehicle charging circuit. The electric vehicle charging circuit includes a first power module and a power storage module. The first power module includes a first AC/DC converter configured to convert an ac voltage to a first bus voltage to a first bus, and a first DC/DC converter electrically coupled to the first AC/DC converter at the first bus, a first external pin electrically coupled to a positive terminal of the first bus and extending to the outside of a housing of the first power module, and a second external pin electrically coupled to a negative terminal of the first bus and extending to the outside of the housing of the first power module. The power storage module is electrically coupled to the first external pin and the second external pin. The power storage module includes a power storage device, and a power converting circuit electrically coupled to the power storage device and electrically coupled to the first bus via the first external pin and the second external pin, and configured to transmit power in bidirectional between the power storage device and the first bus.

Yet another aspect of the present disclosure is a control method of an electric vehicle charging circuit. The control method includes converting an ac voltage to a bus voltage from a grid to a bus by an AC/DC converter in a first power converting circuit; outputting an output current according to the bus voltage by a DC/DC converter in the first power converting circuit; and outputting power to the bus via a second power converting circuit by a power storage device to provide the output current on the condition that an input power of the AC/DC converter reaches an upper rated limit.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
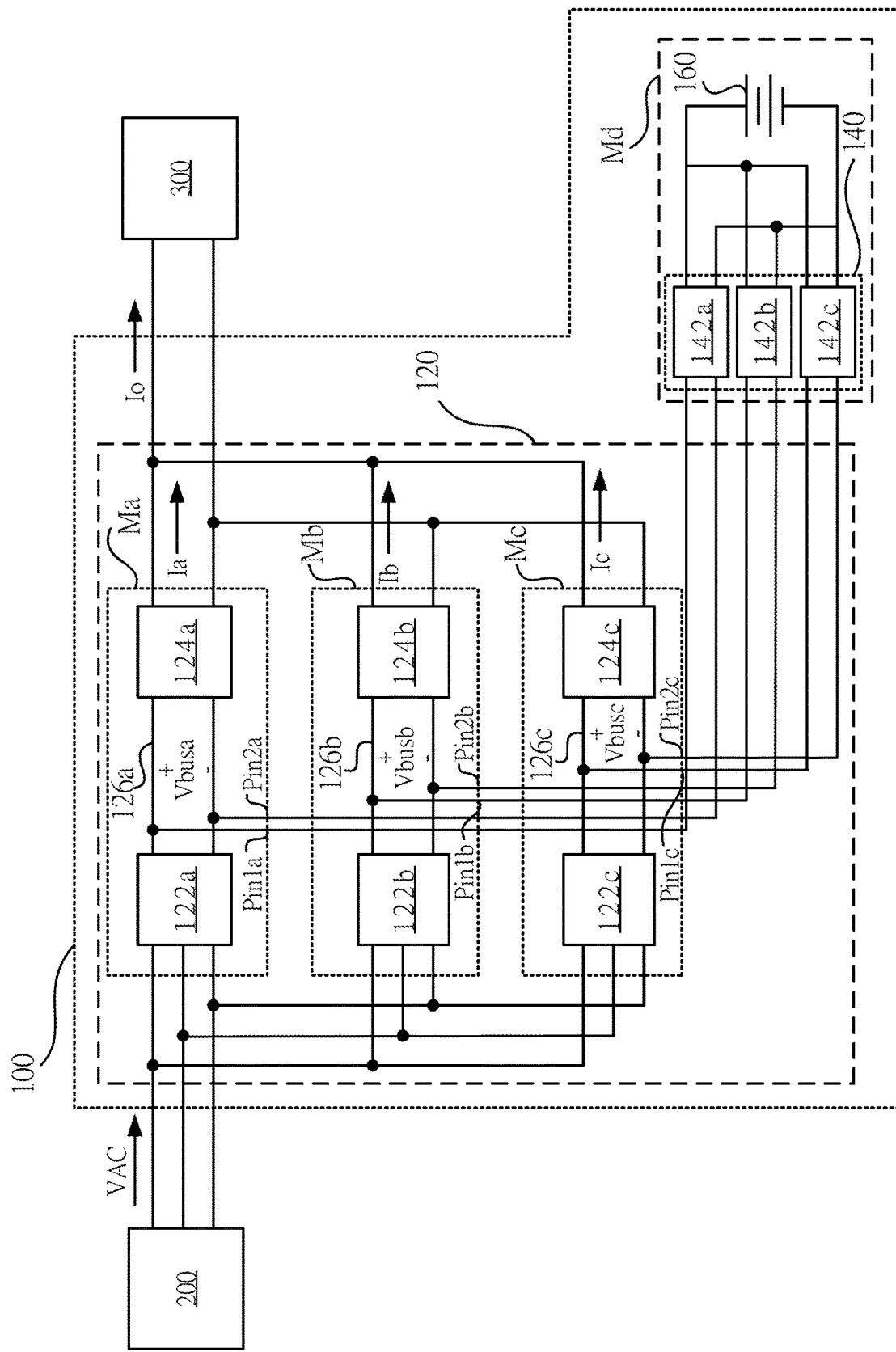
FIG. 1 is a diagram illustrating an electric vehicle charging circuit according to some embodiments of the present disclosure.

Reference will now be made in detail to embodiments of the present disclosure, examples of which are described herein and illustrated in the accompanying drawings. While the disclosure will be described in conjunction with embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. It is noted that, in accordance with the standard practice in the industry, the drawings are only used for understanding and are not drawn to scale. Hence, the drawings are not meant to limit the actual embodiments of the present disclosure. In fact, the dimensions of the various features may be arbitrarily increased or reduced for clarity of discussion. Wherever possible, the same reference numbers are used in the drawings and the description to refer to the same or like parts for better understanding.

The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure.

In the following description and in the claims, the terms "include" and "comprise" are used in an open-ended fashion, and thus should be interpreted to mean "include, but not limited to." As used herein, the term "and/or" includes any and all combinations of one or more of the associated listed items.

In this document, the term "coupled" may also be termed "electrically coupled," and the term "connected" may be termed "electrically connected." "Coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments.

Figure 7:
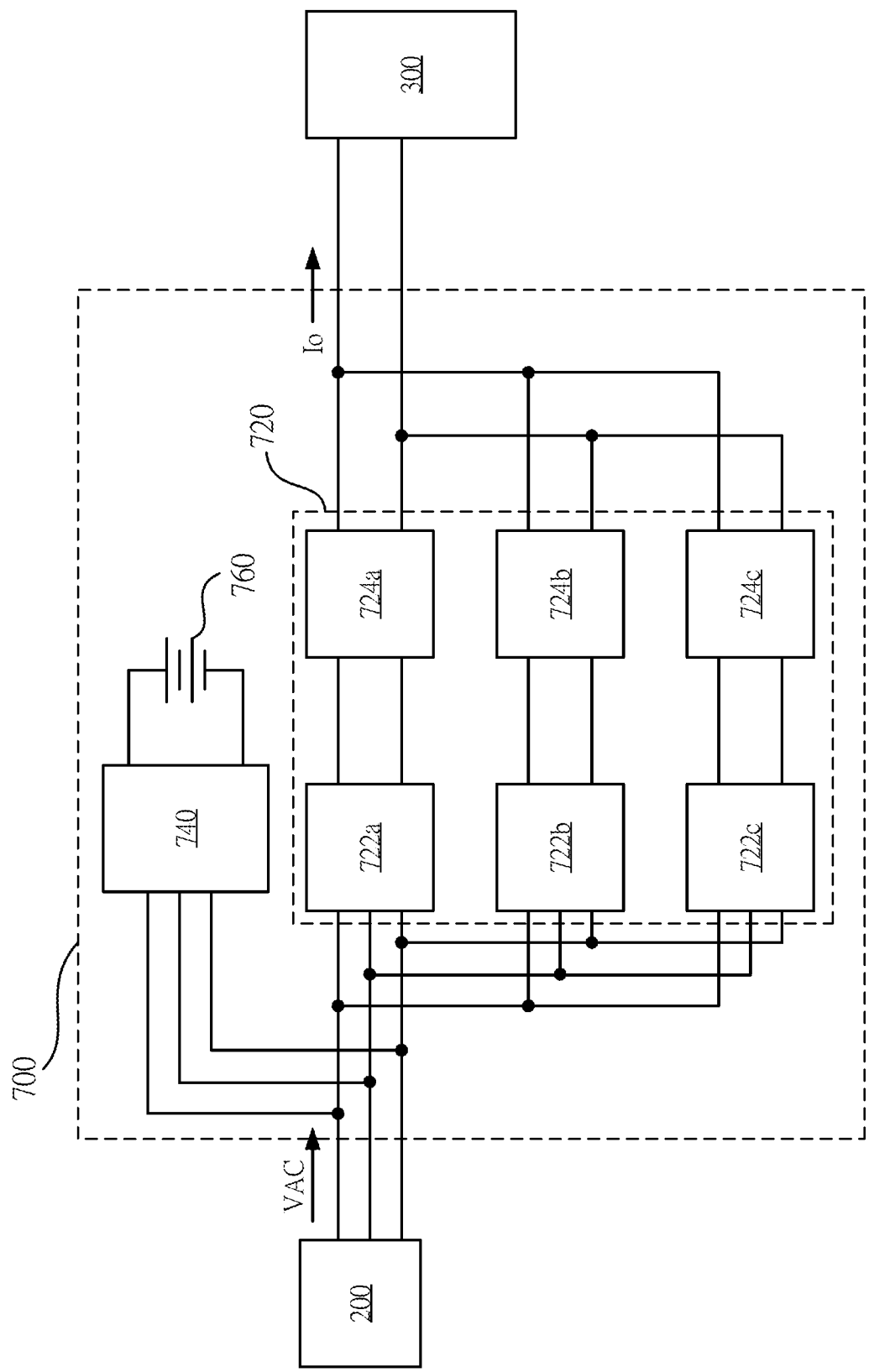
FIG. 7 is a diagram illustrating a known electric vehicle charging circuit.

Reference is made to FIG. 7. FIG. 7 is a diagram illustrating a known electric vehicle charging circuit 700. As shown in FIG. 7, the known electric vehicle charging circuit 700 includes a power converting circuit 720, while a power converting circuit 740 and a power storage element 760 are commonly added in applications. The gird terminal of the electric vehicle charging circuit 700 is electrically coupled to the grid 200, so as to receive an ac voltage VAC from the grid 200. In some embodiments, the ac voltage VAC may be a three phase ac power in the medium voltage (MV) level outputted after a medium voltage isolation circuit in the power system.

In some embodiments, the power converting circuit 720 includes a plurality of power modules electrically coupled to each other in parallel. Each of the power modules receives power from the grid 200 respectively, to supply current output respectively such that the power converting circuit 720 provides output current Io to the load terminal of the electric vehicle charging circuit 700 to charge the electric vehicle 300. For example, each of the power modules includes corresponding AC/DC converters 722a, 722b, 722c and DC/DC converters 724a, 724b, 724, which are configured the convert the ac voltage VAC to proper DC voltage level to provide proper charging voltage and charging current to the electric vehicle 300, in order to satisfy the charging power required by the electric vehicle 300.

When the electric vehicle 300 retrieves electricity from the load terminal of the electric vehicle charging circuit 700 to perform charging, if the charging power required by the electric vehicle 300 is large, the electric vehicle charging circuit 700 cannot provide all power requested via the grid 200. For example, for the purposes of ensuring the stability of the power system, following the related regulations, or financial benefits, the electric vehicle charging circuit 700 are requested to control the power provided by the grid 200 to be lower than the contract capacity dealt with the power company. Alternatively stated, the input power provided by the grid 200 has its upper rated limit.

Therefore, the power converting circuit 740, which is also electrically coupled to the grid 200, is arranged at the grid terminal of the electric vehicle charging circuit 700. The power converting circuit 740 is a bi-directional controllable AC/DC converter, which is configured to convert the extra electricity to proper DC power when there are still margins for the grid 200 to supply power, so as to store the energy in the power storage element 760, and convert the energy stored in the power storage element 760 to ac power and provide to the power converting circuit 720 when the supply from the grid 200 is not enough, to ensure the power provide by the grid 200 is lower than its upper rated limit.

However, there is also a safety upper limit for the withstanding current of the circuit elements in the power converting circuit 720. If the input current of the power converting circuit 720 is too large, the AC/DC converters 722a, 722b, 722c or other circuit elements may be damaged. Thus, under the same withstanding current limitation of elements, the known electric vehicle charging circuit 700 cannot further improve the supply power to satisfy the requirement of the increasing charging power of the electric vehicle. In addition, since the power converting circuit 740 supplies AC power to the power converting circuit 720, when connecting to the grid 200, related regulations must be followed and grid connection permission is required.

Reference is made to FIG. 1. FIG. 1 is a diagram illustrating an electric vehicle charging circuit 100 according to some embodiments of the present disclosure. As shown in FIG. 1, in some embodiments, the electric vehicle charging circuit 100 includes a power converting circuit 120, a power converting circuit 140, and a power storage device 160.

The grid terminal of the electric vehicle charging circuit 100 is configured to be electrically coupled to the grid 200, to receive the ac voltage VAC from the grid 200. For example, in some embodiments, the ac voltage VAC may be a three phase ac power in the medium voltage (MV) level outputted after a medium voltage isolation circuit in the power system.

In some embodiments, the power converting circuit 120 includes a plurality of the power modules Ma, Mb, Mc. The power modules Ma, Mb, Mc are electrically coupled to each other in parallel, and respectively receive power from the grid 200, to provide current Ia, Ib, Ic for output respectively, such that the power converting circuit 120 provides the output current Io to the load terminal of the electric vehicle charging circuit 100, in order to charge the electric vehicle 300.

Specifically, each of the power modules Ma, Mb, Mc includes corresponding AC/DC converters 122a, 122b, 122c and DC/DC converters 124a, 124b, 124c. AC terminals of the AC/DC converters 122a, 122b, 122c are electrically coupled to each other, and output terminals of the DC/DC converters 124a, 124b, 124c are electrically coupled to each other. In some embodiments, the DC/DC converters 124a, 124b, 124c are isolated converters. Taking the power module Ma as an example, the AC/DC converter 122a is configured to receive the ac voltage VAC from the input terminals and convert the ac voltage VAC to the bus voltage Vbusa to the bus 126a between the AC/DC converter 122a and the DC/DC converter 124a. The DC/DC converter 124a is electrically coupled to the AC/DC converter 122a at the bus 126a, and configured to output the current Ia according to the bus voltage Vbusa.

Similarly, the power modules Mb, Mc may also supply the bus voltage Vbusb, bus voltage Vbusc by the AC/DC converters 122b, 122c, and output current Ib, Ic by the DC/DC converters 124b, 124c.

Thus, enough output current Io may be outputted to the electric vehicle 300 to satisfy the charging power required by the electric vehicle 300, with the sum of the current Ia, Ib, and Ic outputted by the power modules Ma, Mb, and Mc.

In some embodiments, the power module Ma further includes external pins Pin1a and Pin2a. The external pin Pin1a is electrically coupled to the positive terminal of the bus 126a and guiding to the outside of the housing of the power module Ma. The external pin Pin2a is electrically coupled to the negative terminal of the bus 126a and guiding to the outside of the housing of the power module Ma. Accordingly, the bus voltage Vbusa may be transmitted via the external pins Pin1a, Pin2a to the outside of the power module Ma. In addition, similarly, the power modules Mb, Mc also includes corresponding external pins Pin1b, Pin2b and external pins Pin1c, Pin2c respectively, which are configured to transmit the bus voltages Vbusb, Vbusc to the outside of the power module Mb, Mc. Alternatively stated, the external pins Pin1a, Pin1b, Pin1c are electrically coupled to the positive terminals of the buses 126a, 126b, 126c respectively, and guiding to the outside of the housing of the corresponding power modules Ma, Mb, Mc. The external pins Pin2a, Pin2b, Pin2c are electrically coupled to the negative terminals of the buses 126a, 126b, 126c and guiding to the outside of the housing of the corresponding power modules Ma, Mb, Mc.

The power converting circuit 140 is electrically coupled between the power storage device 160 and the power converting circuit 120. The power converting circuit 140 is electrically coupled to the bus 126a of the power module Ma via the external pins Pin1a, Pin2a, electrically coupled to the bus 126b of the power module Mb via the external pins Pin1b, Pin2b, and electrically coupled to the bus 126c of the power module Mc via the external pins Pin1c, and Pin2c. Thus, the power converting circuit 140 may be configured to transmit power in bidirectional between the power storage device 160 and the buses 126a, 126b, and 126c.

Specifically, the power converting circuit 140 includes DC/DC converters 142a, 142b, 142c. In some embodiments, the DC/DC converters 142a, 142b, 142c are isolated bidirectional converter, in which terminals at one side of the DC/DC converters 142a, 142b, 142c are respectively coupled via corresponding wires to the buses 126a, 126b and 126c of the power modules Ma, Mb, Mc, and terminals at another side are coupled to each other with the power storage device 160.

In some embodiments, the power storage device 160 may be implemented by batteries or super capacitors and configured to store energy via the power converting circuit 140. In some embodiments, the power converting circuit 140 and the power storage device 160 may also be integrated in a single power storage module Md, such as a movable energy system (MES), to adjust power deliver in accompanying with the power modules Ma, Mb, Mc.

Thus, when performing charging to the power storage device 160, DC/DC converters 142a, 142b, 142c may transmit power from the buses 126a, 126b, 126c to the power storage device 160. On the other hand, when supplying power from the power storage device 160, the DC/DC converters 142a, 142b, 142c may perform power conversion and supply power to the buses 126a, 126b and 126c.

In some embodiments, the power converting circuit 140 is configured to control the power storage device 160 to charge or discharge according to the amplitude of the bus voltages Vbusa, Vbusb, Vbusc, to keep the voltage level of the bus voltages Vbusa, Vbusb, Vbusc. The specific circuit operation will be discussed in detail in the following paragraphs in accompanying with the drawings.

Figure 2:
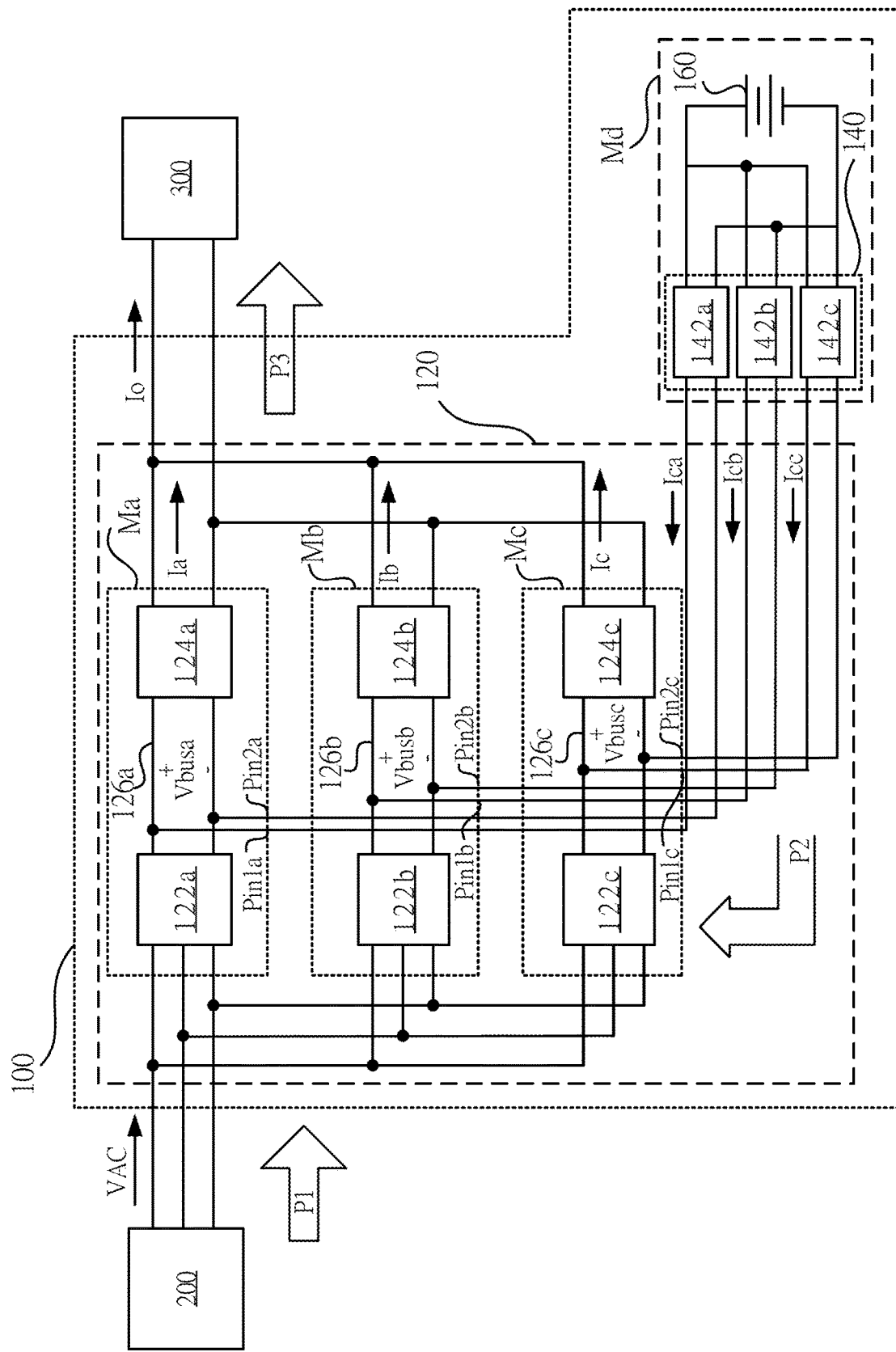
FIG. 2 is an operation diagram illustrating the electric vehicle charging circuit according to some embodiments of the present disclosure.

Reference is made to FIG. 2. FIG. 2 is an operation diagram illustrating the electric vehicle charging circuit 100 according to some embodiments of the present disclosure. As stated in the above paragraphs, similar to the operation of the electric vehicle charging circuit 700 shown in FIG. 7, when the electric vehicle 300 retrieves power to perform charging from the load terminal of the electric vehicle charging circuit 100, if the charging power required by the electric vehicle 300 is large, the electric vehicle charging circuit 100 cannot provide all the required power from the grid 200.

Thus, as shown in the figure, in order to avoid the power supplied by the grid 200 exceeds the upper limit, on the condition that the input power of the AC/DC converters 122a, 122b, 122c reaches the upper rated limit, the power storage device 160 outputs power via the power converting circuit 140 to the buses 126a, 126b, 126c, to provide the output current Io to satisfy the charging power required by the electric vehicle 300.

At the time, the input power of the AC/DC converters 122a, 122b, 122c are kept at the upper rated limit. As the charging power retrieved by the electric vehicle 300 increases, the output power provided by the DC/DC converters 124a, 124b, 124c is greater than the power provided by the AC/DC converters 122a, 122b, 122c, which causes the bus voltages Vbusa, Vbusb, Vbusc of the buses 126a, 126b, 126c decrease.

On the condition that the decrease of the bus voltages Vbusa, Vbusb, Vbusc are detected, the power converting circuit 140 may correspondingly control the power storage device 160 to discharge and output the compensating currents Ica, Icb, Icc to the buses 126a, 126b, 126c, to balance the input power and the output power, so as to keep the voltage level of the bus voltages Vbusa, Vbusb, Vbusc.

Alternatively stated, at the time the power charging the electric vehicle 300 is provided by the grid 200 and the power storage device 160 together. The charging power P3 is the sum of the input power P1 of the grid 200 and the compensating power P2 of the power storage device 160. Thus, the electric vehicle charging circuit 100 may satisfy the high power output required by the electric vehicle 300 while not exceeding the input rated capacity and the input safety current upper limit. In addition, since the compensating currents Ica, Icb, Icc may not flow through the AC/DC converters 122a, 122b, 122c, accordingly, elements with lower withstanding current may be chosen to implement the AC/DC converters 122a, 122b, 122c in order to lower the cost.

Figure 3:
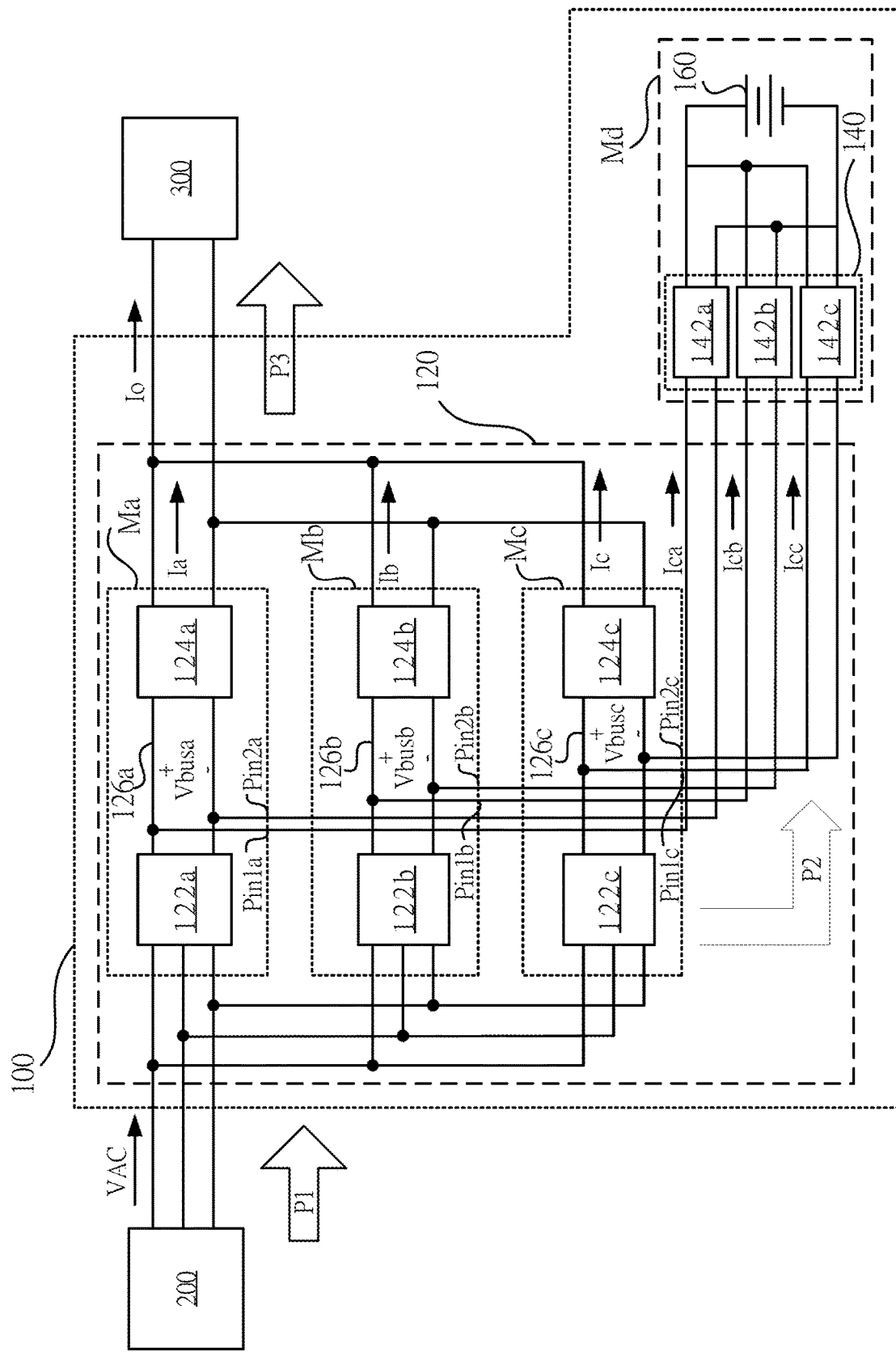
FIG. 3 and FIG. 4 are operation diagrams illustrating the electric vehicle charging circuit according to some embodiments of the present disclosure.
Figure 4:
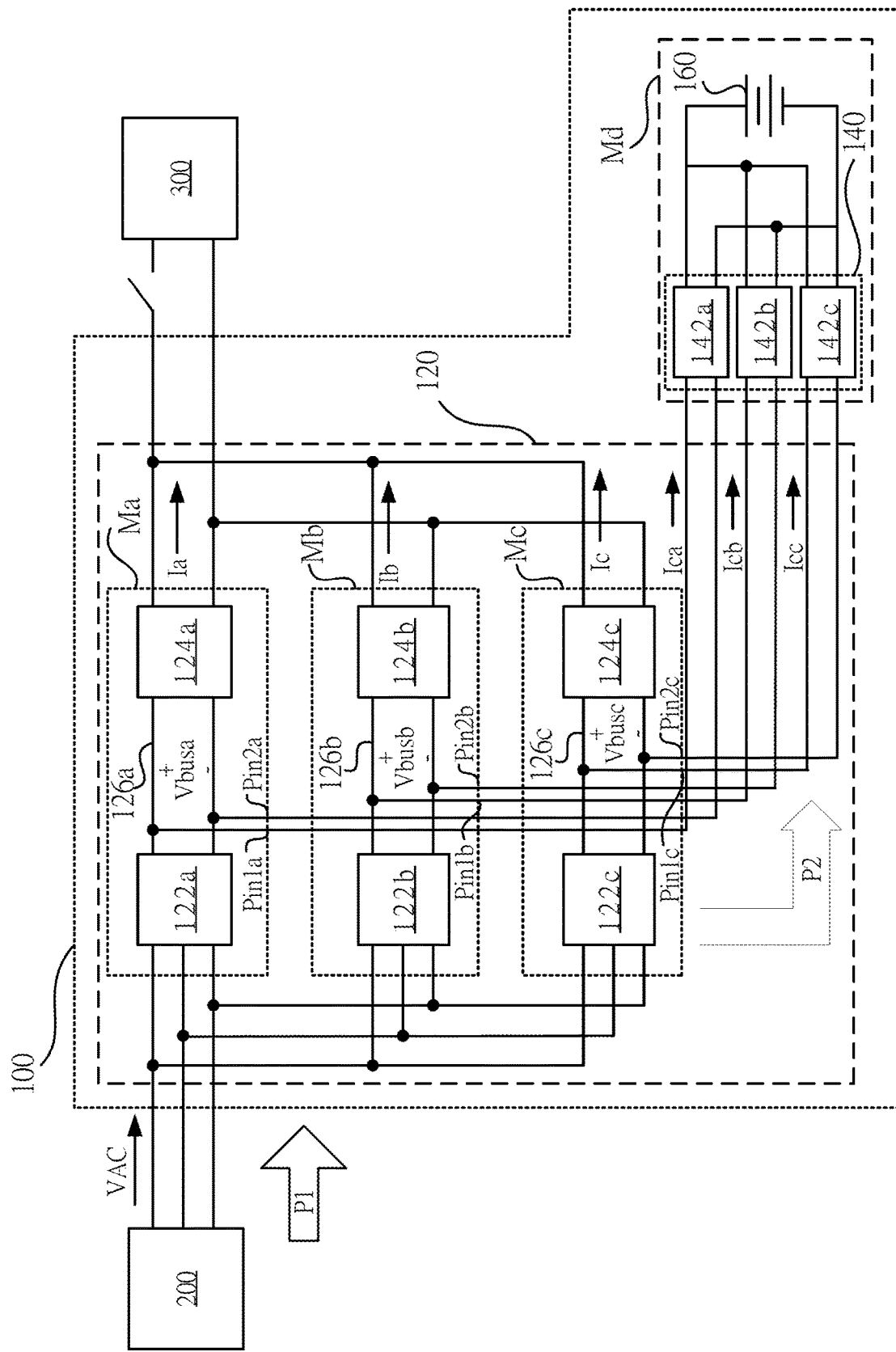

Reference is made to FIG. 3 and FIG. 4. FIG. 3 and FIG. 4 are operation diagrams illustrating the electric vehicle charging circuit 100 according to some embodiments of the present disclosure. As shown in FIG. 3, in some embodiments, when the electric vehicle 300 retrieves power from the load terminal of the electric vehicle charging circuit 100 to charge, if the charging power required by the electric vehicle 300 is low, the electric vehicle charging circuit 100 may, besides charging the electric vehicle 300, provide extra power via the power converting circuit 140 to store energy in the power storage device 160. At the time, the input power P1 of the grid 200 is the sum of the charging power P3 and the charging power P2 charging the power storage device 160.

In addition, as shown in FIG. 4, in some embodiments, when the charging is completed, or no electric vehicle 300 retrieving power from the load terminal of the electric vehicle charging circuit 100, the electric vehicle charging circuit 100 may also store energy to the power storage device 160 by the co-operation of the AC/DC converters 122a, 122b, 122c and the power converting circuit 140. At the time, the input power P1 of the grid 200 is about equal to the charging power P2 charging the power storage device 160.

Alternatively stated, when the input power of the AC/DC converters 122a, 122b, 122c is lower than the upper rated limit, the power storage device 160 may receive power via the power converting circuit 140 from the buses 126a, 126b, 126c. Thus, on the condition that the charging process of the electric vehicle 300 is nearly completed and thus performing charging in low power, or on the condition that no electric vehicle 300 is charging, the electric vehicle charging circuit 100 may receive power from the grid 200 via the AC/DC converters 122a, 122b, 122c and the DC/DC converters 142a, 142b, 142c in the power converting circuit 140, and provide the power storage currents Ica, Icb, Icc to the power storage device 160 to store energy.

In addition, no matter what the charging power required by the electric vehicle 300 is, or whether the electric vehicle 300 is charging, the electric vehicle charging circuit 100 may, by the operation of the power converting circuit 140 and the power storage device 160, keep the power retrieved from the grid 200 stable, and avoid the electricity varies dynamically in response to the later stage load, which effects the stability of the power system.

It is noted that, in some embodiments, the electric vehicle charging circuit 100 may, by arranging corresponding voltage sensing elements and current sensing elements at the input terminal and the output terminal to calculate the input power retrieved by electric vehicle charging circuit 100 from the grid 200, and the charging power of the electric vehicle charging circuit 100 charging the electric vehicle 300. In addition, in some other embodiments, multiple sets of voltage sensing elements and current sensing elements may be arranged in the electric vehicle charging circuit 100 in the power modules Ma, Mb, Mc, in order to respectively calculate and sum up the power of the power modules Ma, Mb, Mc. Alternatively stated, the electric vehicle charging circuit 100 may calculate the input power and the charging power in various ways, to determine whether the input power exceeds the target value or whether the electric vehicle 300 is charging, in order to perform corresponding control operations.

Figure 5:
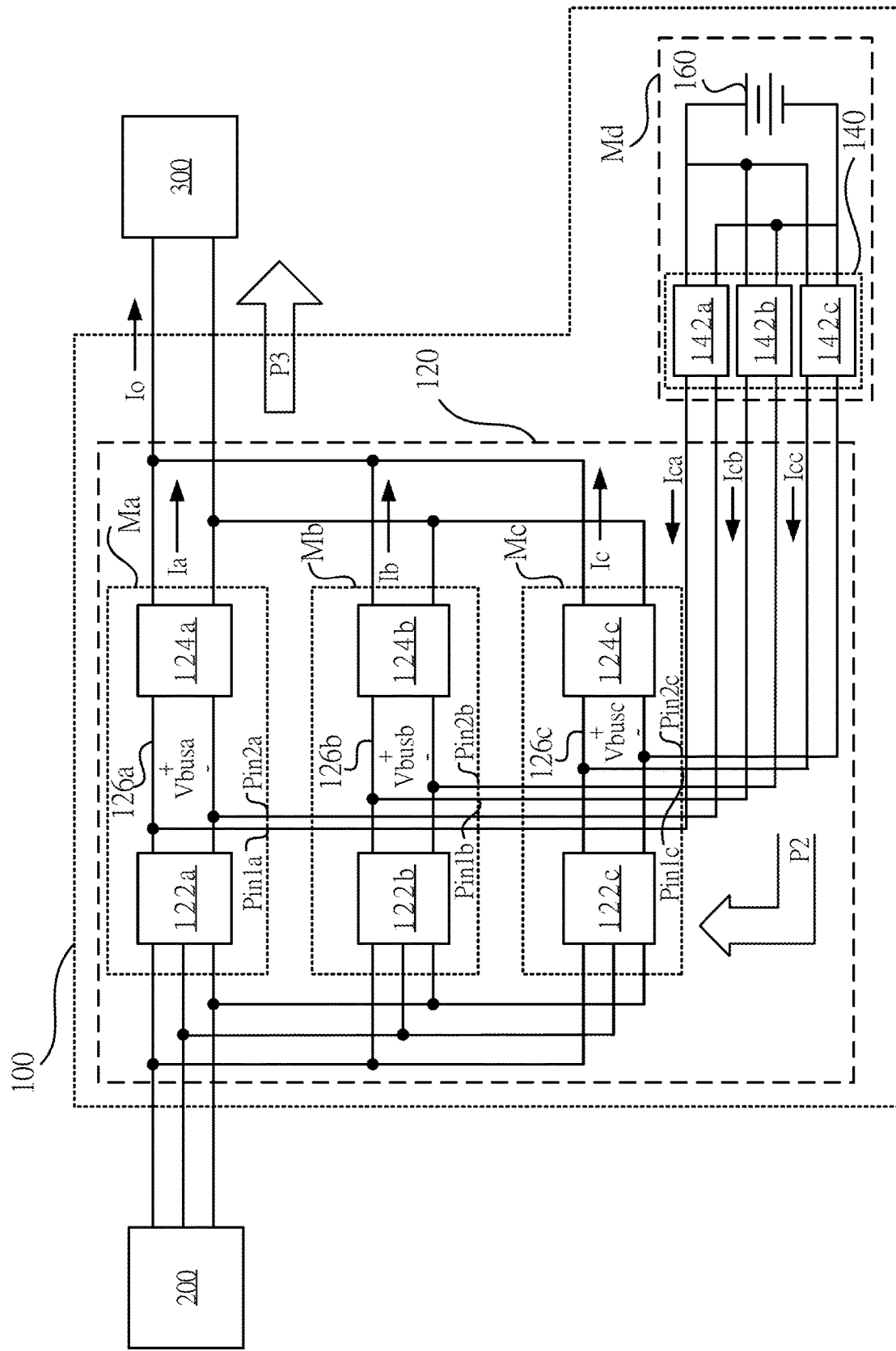
FIG. 5 is an operation diagram illustrating the electric vehicle charging circuit according to some embodiments of the present disclosure.

Reference is made to FIG. 5. FIG. 5 is an operation diagram illustrating the electric vehicle charging circuit 100 according to some embodiments of the present disclosure. As shown in FIG. 5, in some embodiments, when the electric vehicle 300 retrieves power from the load terminal of the electric vehicle charging circuit 100 for charging, the electric vehicle charging circuit 100 may also charge the electric vehicle 300 by the power storage device 160, while not retrieving energy from the grid 200. At the time, the charging power P3 is about equal to the compensating power P2 of the power storage device 160.

In some embodiments, the electric vehicle charging circuit 100 may execute economical dispatching, to reduce the cost of charging the electric vehicle 300. For example, the electric vehicle charging circuit 100 may purchase electricity from the grid 200 during a period with lower electricity price, and stored the energy in the power storage device 160. During a period with higher electricity price, the electric vehicle charging circuit 100 may choose to supply power to charge the electric vehicle by the power storage device 160. Thus, the electric vehicle charging circuit 100 may complete charging with a lower cost.

In addition, in some embodiments, when an abnormal electrical power supply situation happens in the grid 200 and a power outage or a power drop occurs, the electric vehicle charging circuit 100 may also charge the electric vehicle 300 by the power stored in the power storage device 160, and the charging is not affected by the abnormal situation of the grid 200.

In summary, the electric vehicle charging circuit 100 may perform the electricity transmission between the grid 200, the power storage device 160 and the electric vehicle 300 with various different control strategies according to the grid status and the load status.

In some embodiments, the AC/DC converters 122a, 122b, 122c and the DC/DC converters 124a, 124b, 124c may be unidirectional converter, integrated in the power modules Ma, Mb, Mc correspondingly, and connected to the DC/DC converters 142a, 142b, 142c in the power converting circuit 140 via external pins Pin1a, Pin2a, Pin1b, Pin2b, Pin1c, and Pin2c.

Thus, each power modules Ma, Mb, Mc may keep at high converting efficiency, and reduce the power loss in the electric vehicle charging circuit 100. In addition, since each power module Ma, Mb, Mc may perform power compensation with the same power storage module Md to corresponding buses 126a, 126b, 126c, in a high output power application, the electric vehicle charging circuit 100 reserves a high extension flexibility. For example, the electric vehicle charging circuit 100 may add or cut the amounts of the power module based on the actual needs, to fit the potential requirement of higher load power in the future. Thus, the augmented power module may also be electrically coupled to the power converting circuit 140 in the movable energy system (MES) via the external pins, and share the power storage device 160 with the original power modules Ma, Mb, Mc to perform charging and discharging in bidirectional.

In addition, in some other embodiments, the AC/DC converters 122a, 122b, 122c may also be bidirectional converters. Thus, the electric vehicle charging circuit 100 may also provide the power stored in the power storage device 160 to the grid 200 in the reverse direction when there is a power demand in the grid 200, to relieve the pressure of power supply of the grid 200 during the peak load. Alternatively stated, in various embodiments, the converters in the electric vehicle charging circuit 100 may be implemented by proper circuit elements according to actual requirements. Furthermore, the power converting circuit 140 may not be directly connected to the grid 200, so no additional grid connection permissions are required when expanding or replacing the power converting circuit 140, so the flexibility of the power converting circuit 140 is improved.

Figure 6:
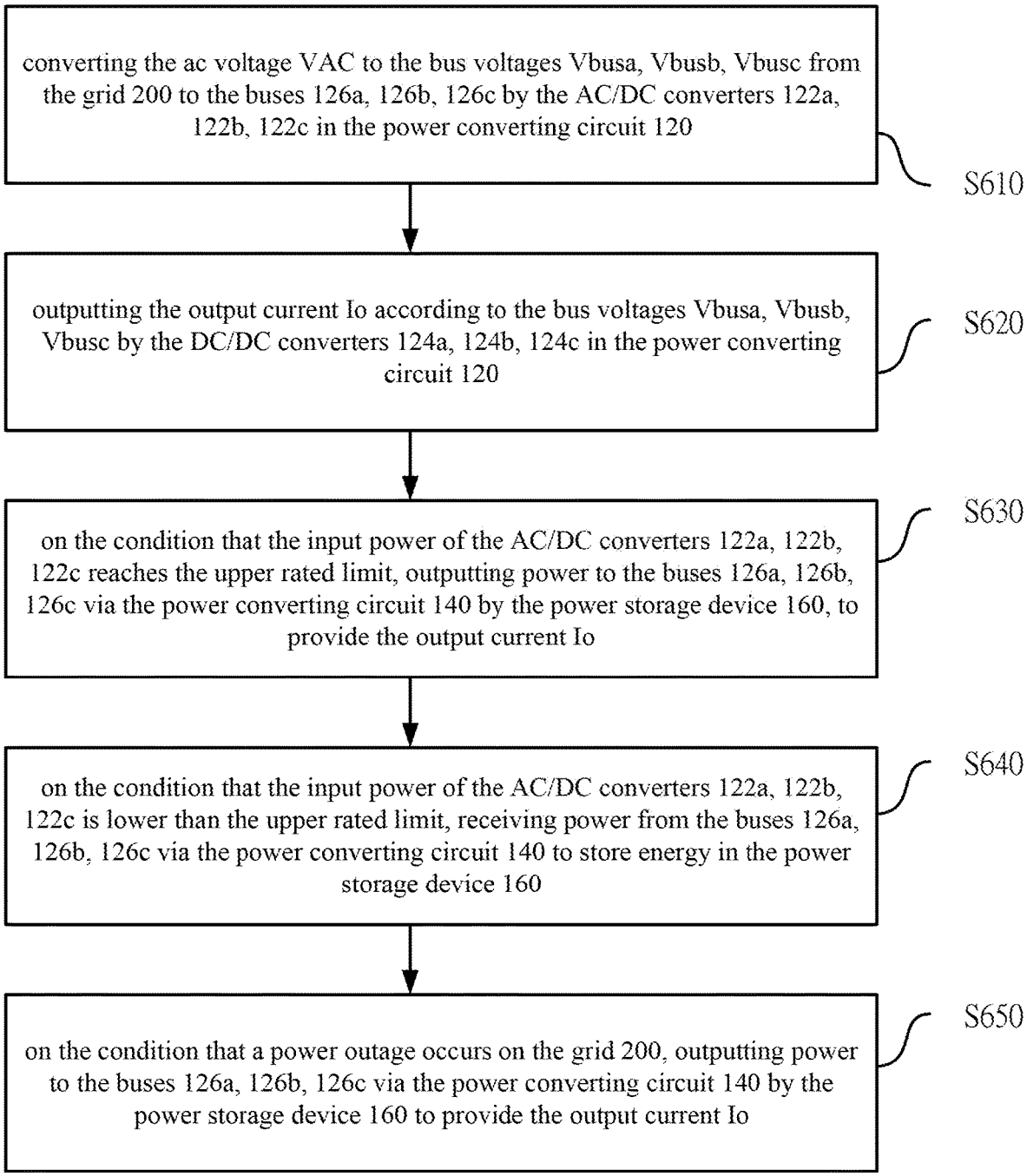
FIG. 6 is a flowchart illustrating a control method of the electric vehicle charging circuit according to some embodiments of the present disclosure.

Reference is made to FIG. 6. FIG. 6 is a flowchart illustrating a control method 600 of the electric vehicle charging circuit 100 according to some embodiments of the present disclosure. For better understanding of the present disclosure, the following control method 600 is discussed in accompanied with the embodiments of FIG. 1-FIG. 5 but not limited thereto. For those skilled in the art, various modifications and variations can be made without departing from the scope or spirit of the disclosure. As shown in FIG. 6, the control method 600 includes steps S610, S620, S630, S640 and S650.

First, in the step S610, the electric vehicle charging circuit 100 converts the ac voltage VAC to the bus voltages Vbusa, Vbusb, Vbusc from the grid 200 to the buses 126a, 126b, 126c by the AC/DC converters 122a, 122b, 122c in the power converting circuit 120.

Next, in the step S620, the electric vehicle charging circuit 100 outputs the output current Io according to the bus voltages Vbusa, Vbusb, Vbusc by the DC/DC converters 124a, 124b, 124c in the power converting circuit 120.

In the step S630, on the condition that the input power of the AC/DC converters 122a, 122b, 122c reaches the upper rated limit, the electric vehicle charging circuit 100 outputs power to the buses 126a, 126b, 126c via the power converting circuit 140 by the power storage device 160, to provide the output current Io.

In step S640, on the condition that the input power of the AC/DC converters 122a, 122b, 122c is lower than the upper rated limit, the electric vehicle charging circuit 100 receives power from the buses 126a, 126b, 126c via the power converting circuit 140 to store energy in the power storage device 160.

Specifically, in some embodiments, steps S630, S640 includes controlling the power storage device 160 to charge or discharge according to the bus voltages Vbusa, Vbusb, Vbusc, in order to keep the voltage level of the bus voltages Vbusa, Vbusb, Vbusc by the power converting circuit 140.

In step S650, on the condition that a power outage occurs on the grid 200, the electric vehicle charging circuit 100 outputs power to the buses 126a, 126b, 126c via the power converting circuit 140 by the power storage device 160 to provide the output current Io.

Thus, the electric vehicle charging circuit 100 may be operated under proper control mode to perform power dispatch according to the power system and the load condition, in order to ensure that the charging cost and the impact to the grid 200 are both lowered when charging the electric vehicle 300.

Those skilled in the art can immediately understand how to perform the operations and functions of the control method 600 based on the electric vehicle charging circuit 100 in the embodiments described above, and thus a further explanation is omitted herein for the sake of brevity.

The above description includes exemplary operations, but the operations are not necessarily performed in the order described. The order of the operations disclosed in the present disclosure may be changed, or the operations may even be executed simultaneously or partially simultaneously as appropriate, in accordance with the spirit and scope of various embodiments of the present disclosure.

Although the disclosure has been described in considerable detail with reference to certain embodiments thereof, it will be understood that the embodiments are not intended to limit the disclosure. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An electric vehicle charging circuit, comprising:
    a first power converting circuit configured to provide an output current to charge an electric vehicle, wherein the first power converting circuit comprises:
        an AC/DC converter configured to convert an AC voltage to a bus voltage to a bus; and
        a DC/DC converter electrically coupled to the AC/DC converter at the bus and configured to output the output current;
    a power storage device; and
    a second power converting circuit electrically coupled between the power storage device and the bus, and configured to bi-directionally transmit power between the storage device and the bus, wherein the second power converting circuit comprises an isolated bidirectional converter,
    wherein the first power converting circuit further comprises a plurality of power modules, each of the power modules comprises the corresponding AC/DC converter and the DC/DC converter,
    wherein each of the power modules comprises a first external pin and a second external pin, the first external pin is electrically coupled to a positive terminal of the bus and extending to the outside of a housing of the corresponding module, and the second external pin is electrically coupled to a negative terminal of the bus and extending to the outside of the housing of the corresponding module.

2. The electric vehicle charging circuit of claim 1, wherein the second power converting circuit is configured to control the power storage device to charge or discharge according to the bus voltage in order to keep the voltage level of the bus voltage.

3. The electric vehicle charging circuit of claim 1, wherein the second power converting circuit comprises a plurality of second DC/DC converters, and input terminals of the second DC/DC converters are electrically coupled to the bus of the power modules respectively, and output terminals of the second DC/DC converters are coupled in parallel to each other to the power storage device wherein the second DC/DC converters are isolated bidirectional converters.

4. The electric vehicle charging circuit of claim 1, wherein the power modules are electrically coupled to each other in parallel, wherein ac terminals of the AC/DC converters in the power modules are electrically coupled to each other, output terminals of the DC/DC converters in the power modules are electrically coupled to each other.

5. The electric vehicle charging circuit of claim 1, wherein the power storage device is configured to output power to the bus via the second power converting circuit to provide the output current on the condition that an input power reaches an upper rated limit.

6. The electric vehicle charging circuit of claim 1, wherein the power storage device is configured to receive power from the bus via the second power converting circuit to store energy on the condition that an input power is lower than an upper rated limit.

7. The electric vehicle charging circuit of claim 1, wherein the DC/DC converter is an isolated unidirectional converter.

8. An electric vehicle charging circuit, comprising:
    a first power module, comprising:
        a first AC/DC converter configured to convert an ac voltage to a first bus voltage to a first bus;
        a first DC/DC converter electrically coupled to the first AC/DC converter at the first bus;
        a first external pin electrically coupled to a positive terminal of the first bus and extending to the outside of a housing of the first power module;
        a second external pin electrically coupled to a negative terminal of the first bus and extending to the outside of the housing of the first power module; and
    a power storage module electrically coupled to the first external pin and the second external pin, comprising:
        a power storage device; and
        a power converting circuit electrically coupled to the power storage device and electrically coupled to the first bus via the first external pin and the second external pin, and configured to transmit power in bidirectional between the power storage device and the first bus;

a second power module electrically coupled to the first power module in parallel, wherein the second power module comprises:
a second AC/DC converter configured to convert the ac voltage to a second bus voltage to a second bus;
a second DC/DC converter electrically coupled to the second AC/DC converter at the second bus;
a third external pin electrically coupled to a positive terminal of the second bus and extending to the outside of a housing of the second power module; and
a fourth external pin electrically coupled to a negative terminal of the second bus and extending to the outside of the housing of the second power module; and
wherein the power converting circuit is electrically coupled to the second bus via the third external pin and the fourth external pin, and configured to transmit power in bidirectional between the power storage device and the second bus.

9. The electric vehicle charging circuit of claim 8, wherein the power converting circuit comprises:
a third DC/DC converter, wherein a first terminal of the third DC/DC converter is electrically coupled to the first bus, and a second terminal of the third DC/DC converter is electrically coupled to the power storage device; and
a fourth DC/DC converter, wherein a first terminal of the fourth DC/DC converter is electrically coupled to the second bus, and a second terminal of the fourth DC/DC converter is electrically coupled to the power storage device.

10. The electric vehicle charging circuit of claim 9, wherein the third DC/DC converter and the fourth DC/DC converter are isolated bidirectional converters.

11. The electric vehicle charging circuit of claim 8, wherein the power converting circuit is configured to control the power storage device to charge or discharge according to the amplitude of the first bus voltage to keep the voltage level of the first bus voltage.

12. The electric vehicle charging circuit of claim 8, wherein the power storage device is configured to output power to the first bus via the first external pin and the second external pin on the condition that an input power reaches an upper rated limit.

13. The electric vehicle charging circuit of claim 8, wherein the power storage device is configured to receive power from the first bus via the first external pin and the second external pin on the condition that an input power is lower than an upper rated limit.

14. A control method of an electric vehicle charging circuit, comprising:
converting an ac voltage to a bus voltage from a grid to a bus by an AC/DC converter in a first power converting circuit;
outputting an output current according to the bus voltage by a DC/DC converter in the first power converting circuit; and
outputting power to the bus via a second power converting circuit by a power storage device to provide the output current on the condition that an input power of the AC/DC converter reaches an upper rated limit,
wherein the first power converting circuit further comprises a plurality of power modules, each of the power modules comprises the corresponding AC/DC converter and the DC/DC converter,
wherein each of the power modules comprises a first external pin and a second external pin, the first external pin is electrically coupled to a positive terminal of the bus and extending to the outside of a housing of the corresponding module, and the second external pin is electrically coupled to a negative terminal of the bus and extending to the outside of the housing of the corresponding module.

15. The control method of the electric vehicle charging circuit of claim 14, further comprising:
receiving power from the bus via the second power converting circuit to store energy in the power storage device on the condition that the input power of the AC/DC converter is lower than the upper rated limit.

16. The control method of the electric vehicle charging circuit of claim 14, further comprising:
controlling the power storage device to charge or discharge according to the bus voltage in order to keep the voltage level of the bus voltage by the second power converting circuit.

17. The control method of the electric vehicle charging circuit of claim 14, further comprising:
outputting power to the bus via the second power converting circuit by the power storage device to provide the output current on the condition that a power outage occurs on the grid.

* * * * *